United States Patent
Mori

[11] 3,766,804
[45] Oct. 23, 1973

[54] HYDROMECHANICAL POWER TRANSMISSION SYSTEM

[75] Inventor: Yoichi Mori, Yokohama, Japan

[73] Assignee: Nissan Motor Company, Limited, Yokohama, Japan

[22] Filed: Nov. 9, 1971

[21] Appl. No.: 197,105

[30] Foreign Application Priority Data
Dec. 25, 1970 Japan.............................. 45/118133

[52] U.S. Cl. ................................................ 74/687
[51] Int. Cl............................................. F16h 47/04
[58] Field of Search ...................... 60/53 B; 74/687, 74/690, 691

[56] References Cited
UNITED STATES PATENTS

| | | | |
|---|---|---|---|
| 3,368,425 | 2/1968 | Lewis............................ | 74/687 X |
| 3,283,612 | 11/1966 | Densham ........................ | 74/687 |
| 2,901,922 | 9/1959 | Baker................................. | 74/687 |
| 2,220,174 | 11/1940 | Ravigneaux...................... | 74/763 X |
| 2,646,755 | 7/1953 | Jog..................................... | 91/497 X |
| 2,772,755 | 12/1956 | Nallinger et al. ................. | 91/498 X |
| 3,489,036 | 1/1970 | Cockrell et al. ..................... | 74/687 |
| 3,385,059 | 5/1968 | Leonard et al. ................... | 74/497 X |

Primary Examiner—Arthur T. McKeon
Attorney—John Lezdey

[57] ABSTRACT

A hydromechanical power transmission system is disclosed, including a positive-displacement variable-speed piston-type hydrostatic power transmission driven by an input shaft and a coordinating planetary gear train connected to an output shaft. The hydrostatic transmission is made up of a variable-displacement unit connected to the input shaft and usually acting as a pump and a constant-displacement unit positioned in series with the variable-displacement unit and usually acting as a hydraulic motor. A portion of the power input is transmitted to the output shaft through the hydrostatic transmission and the remaining portion is transmitted by the planetary gear train as a mechanical transmission unit so that the power transmission efficiency is higher than that attained in the conventional hydrostatic power transmission which is void of such mechanical transmission unit. A typical application of such transmission system is an automotive vehicle.

9 Claims, 16 Drawing Figures

HYDROMECHANICAL POWER TRANSMISSION SYSTEM

This invention relates generally to power transmission system and has its particular reference to a hydromechanical variable-speed power transmission system in which a hydrostatic power transmission is combined with a mechanical transmission unit. The hydromechanical power transmission system herein disclosed is capable of steplessly delivering outputs of varied revolution speeds from an input mechanical power having a fixed speed and, as such, is adapted to be used in an automotive vehicle driveline.

Hydrostatic power transmissions generally use a variable-displacement pump unit as a source of fluid power and a constant-displacement or variable-displacement hydraulic motor unit. Both the pump and motor units are usually of the piston type and are respectively connected to suitable driving and driven members which may be input and output shafts of a power train of an automotive vehicle. Power from the driving member or input shaft is transmitted to the driven member or output shaft by the aid of said fluid as a result of the pump delivery and the fluid pressure.

The positive-displacement piston-type hydrostatic power transmissions are adapted to provide ease and simplicity of operation because of its ability to steplessly deliver outpus of various speeds from a source of power having a constant revolution speed and because of the fact that the stepless change of the revolution speed and even reversed motions of the motor unit can be effected without use of clutches and geared reduction mechanisms. Less shocks and vibrations are invited than in the purely mechanical power transmissions and the fluctuations in the torque transmitted are largely subdued by the working fluid itself, thus dispensing with time and labour for the periodical inspection an maintenance servicing of the transmission as a whole. Another advantage is that hydraulic braking actions are applicable during deceleration conditions.

In spite of these outstanding advantages over the mechanical transmissions, the hydrostatic power transmissions have drawbacks in that the torque transmission efficiencies are apt to be degraded under light-load and/or high-speed driving conditions and that the overall constructions of the transmissions are intricate and disproportionately large-sized for the transmission torque capacities required.

It is, therefore, an important object of this invention to provide a new and useful hydromechanical variable-speed power transmission system which is simple in construction and economical to manufacture and in which the torque is transmitted at a satisfactorily elevated efficiency throughout various operational conditions.

The hydromechanical power transmission system to achieve this object is generally made up of a combination of a hydrostatic power transmission and a cooperation planetary gear train as the mechanical transmission unit. The hydrostatic power transmission includes a variable-displacement unit driven by an input shaft and a constant-displacement unit whic coacts with the variable-displacement unit. The variable-displacement and constant-displacement units act as a pump and a hydraulic motor, respectively, under various modes of operation of the hydrostatic transmission excepting the deceleration condition. Each of the units includes a rotatable cylinder block and a cam ring which is rockably positioned around the cylinder block. The cylinder block, in turn, comprises a plurality of generally equidistantly spaced cylinders which are directed toward an axis of rotation of the cylinder block and a plurality of ball piston elements which are respectively received in these cylinders in a manner to be movable toward and away from the axis of rotation of the cylinder block. The cylinders may be constituted by cylindrical openings which are radially formed in the cylinder block. The cam ring of each cylinder block has an internal circular cam surface to be engaged by the individual ball piston elements.

The cam ring for the variable-displacement unit is position-adjustable with respect to the associated cylinder block so as to vary the ratio between the displacements of the variable-displacement and constant displacement units during operation. The cam ring is thus pivotally connected to a suitable stationary member such as a housing of the transmission system and is rockable over the outer peripheral wall of the cylinder block about the pivotal connection under the control of actuating means. This actuating means is operable to displace the cam ring of the variable-displacement unit in a plane transverse to the axis of rotation of the associated cylinder block, thereby providing controlled degrees of eccentricity between the cam ring and the axis of rotation of the cylinder block.

First and second pressure distribution passage means are provided in the hydrostatic transmission, leading from a source of a fluid under pressure and communicating with the variable-displacement and constant-displacement units to actuate these units by the fluid pressure. The first pressure distribution passage means is adapted to provide fluid communication between those cylinders of the variable-displacement and constant-displacement units in which the ball piston elements received therein are moved or being moved toward the axes of rotation of the cylinder blocks as they revolve on the internal cam surfaces of the cam rings. The second pressure distribution passage means, on the other hand, is adapted to provide fluid communication between those cylinders of the variable-displacement units in which the ball piston elements received therein are moved or being moved away from the axes of rotation of the cylinder blocks. The delivery of the fluid from the variable-displacement unit is thus varied over a stepless range in either direction from zero to maximum through reciprocating motions of the individual ball piston elements of the unit.

The constant-displacement unit of the hydrostatic power transmission is operatively connected to the output shaft or the driven member through the planetary gear train above mentioned. This planetary gear train, the construction of which per se is well known in the art, comprises a first rotary element constantly driven by the input shaft, a second rotary element driven by the constant-displacement unit of the hydrostatic transmission and a third rotary element which is connected to the output shaft. The input shaft extends through the hydrostatic transmission before it terminates in the planetary gear train so that the transmission system in its entirety can be of satisfactorily compact and small-sized construction which is ready to be assembled and installed in a limited working space. Because, moreover, the system according to this invention is arranged in a manner that a portion of the power from the input shaft is transmitted to the output shaft in a mechanical fashion, namely, without resort to the fluid pressure, the total transmission efficiency can be increased to a considerable extent. The hydromechanical power transmission system according to this invention is thus capable of transmitting a relatively large power for its simple and small-sized construction and is, therefore, specifically adapted for use in automotive vehicles.

The actuating means for the adjustable cam ring of the variable-displacement unit of the hydrostatic transmission may be manually operated but it is most preferable that such means be automatically driven in response to desired or selected operational conditions of, for example, the automotive vehicle whereby the delivery of the fluid from the variable-displacement unit and accordingly the speed reduction ratio can be regulated continually in accordance with the varying operation requirements of the automotive vehicle. The actuating means of this nature usually consumes a considerable amount of power in driving the adjustable cam ring so that the transmission system requires a supply of additional power for this particular purpose. It is, therefore, another important object of this invention to provide a new and useful hydromechanical power transmission system having improved actuating means capable of steplessly driving the adjustable cam ring of the constant-displacement unit of the hydrostatic transmission with a minimum of power requirement.

Figure 1:
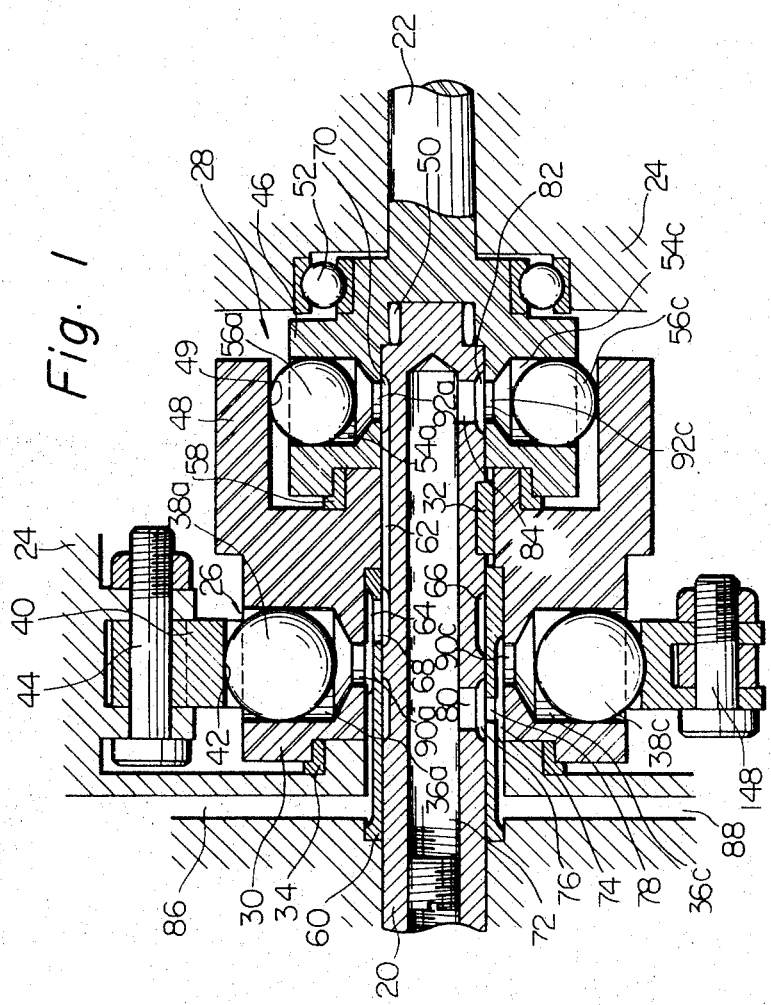
FIG. 1 is a sectional view of a hydrostatic power transmission which forms part of the hydromechanical power transmission system according to this invention.
Figure 2:
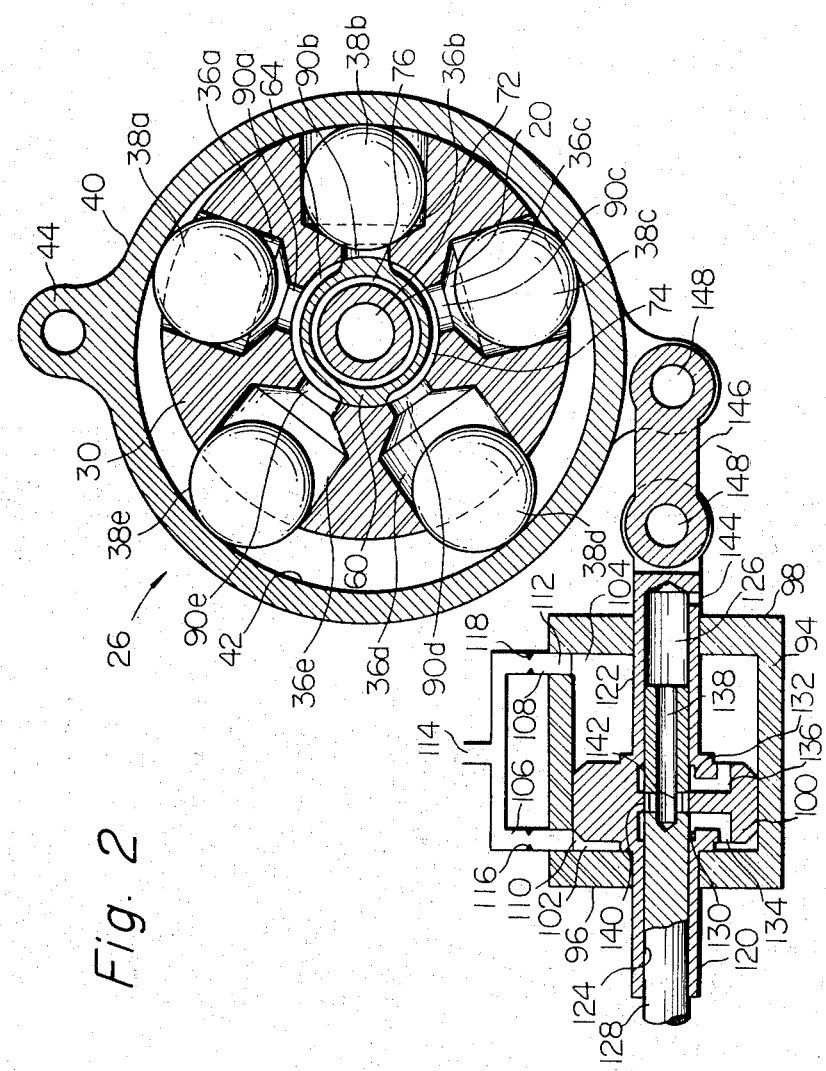
FIG. 2 is a cross sectional view illustrating a variable-displacement unit of the hydrostatic power transmission shown in FIG. 1, this unit being illustrated as associated with cam ring actuating means which is shown in cross section.
Figure 3:
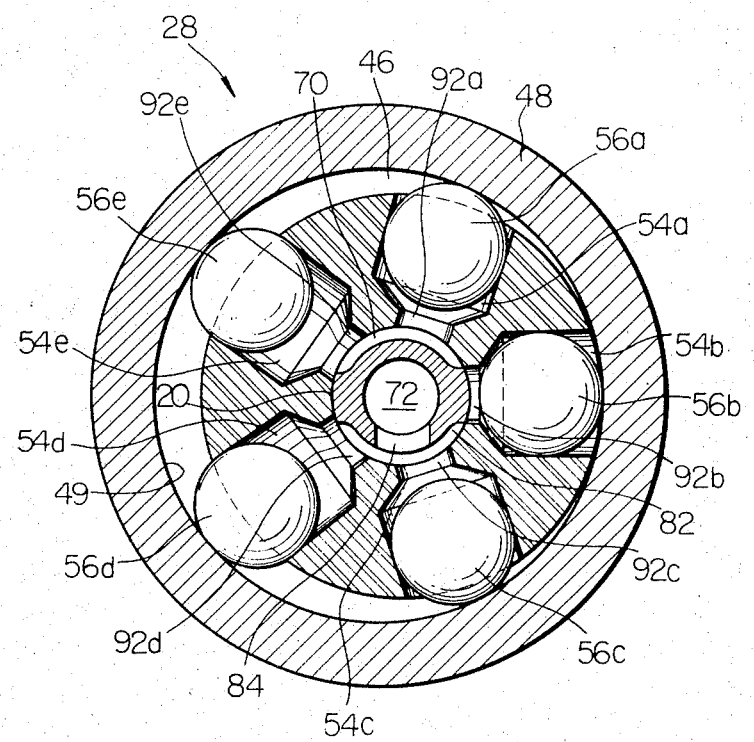
FIG. 3 is a cross sectional view of a constant-displacement unit of the hydrostatic transmission shown in FIG. 1.

Reference is now had concurrently to FIGS. 1 to 3 in which a preferred form of the positive-displacement piston-type hydrostatic transmission which is to form essential part of the hydromechanical power transmission system is illustrated. As seen in FIG. 1, the hydrostatic power transmission intervenes between an input shaft 20 as a driving member and an output shaft 22 as a driven member. Where the shown transmission is to be incorporated in an automotive vehicle, the input shaft 20 is driven by a crankshaft for a vehicle power plant such as an internal combustion or gas turbine engine and the output shaft 22 is connected to the vehicle traction wheels via a suitable driveline. The hydrostatic transmission is encased in a power transmission housing which is generally indicated by reference numeral 24.

The hydrostatic power transmission as shown is made up of a variable-displacement unit 26 operable to deliver a fluid pressure and a constant-displacement unit 28 which is operable to deliver a power output in response to this fluid pressure. The variable-displacement unit 26 includes a cylinder block 30 which rotatable with the input shaft 20 through a key 32 and supported on the transmission housing 24 through a bearing 34. This cylinder block 30 has a generally circular cross section and is formed with a plurality of substantially equidistantly spaced piston cylinders which are shown to be constituted by cylindrical openings or chambers 36a to 36e as seen in FIG. 2. It may be noted that, although these cylindrical chambers are herein shown as five in number, such is by way of example only and that the number thereof can be selected as desired. Ball piston elements 38a to 38e are received in the cylindrical chambers 36a to 36e, respectively, in a manner to be slidable therein toward and away from the axis of rotation of the cylinder block 30.

The cylinder block 30 is surrounded by an adjustable cam ring 40 having a circular inner cam surface with which the individual ball piston elements 38a to 38e are held in sliding engagement. This cam surface may be annularly grooved as at 42, thereby adding to the area of contact between the ball piston elements and the cam ring. This cam ring 40 is pivotally supported by the transmission housing 24 through a pin 44 so as to be rockable over the outer peripheral wall of the cylinder block 30, viz., in a plane transverse to the axis of rotation of the cylinder block. The cam ring 40 thus being position-adjustable with respect to the cylinder block, controlled degrees of eccentricity are provided between the cam ring and the axis of rotation of the cylinder block depending upon the angular position of the cam ring. This angular position of the cam ring is continuously adjusted by suitable actuating means which is to be described later.

The constant-displacement unit 28, on the other hand, includes a cylinder block 46 having a generally circular cross section and a rotatable cam ring 48 which is positioned around the cylinder block 46. The cylinder block 46 is rotatable on the leading end portion of the input shaft 20 through a bearing 50 and is supported by the transmission housing 24 through a bearing 52, as illustrated in FIG. 1. The cylinder block 46 has formed therein a plurality of cylindrical chambers, shown as five in number by 54a to 54e in FIG. 3, which extend radially of the cylinder block 46. These cylindrical chambers 54a to 54e receive therein ball piston elements 56a to 56e, respectively, which are slidable toward and away from the axis of rotation of the cylinder block 46. The cylinder block 46 of the constant-displacement unit 28 is thus essentially similar in construction to its counterpart is the variable-displacement unit 26. Different from the unit 26, the cam ring 48 surrounding the individual ball piston elements 56a to 56e of the constant-displacement unit 28 is integral with the cylinder block 30 of the variable-displacement unit so as to be rotatable on or with the cylinder block 46 of the constant-displacement unit through a bearing 58. In other words, the cam ring 48 of the constant-displacement unit is constituted by a generally cylindrical extension of the cylinder block 30 of the variable-displacement unit. The cam ring 48 has a circular inner cam surface which is engaged by the individual ball piston elements 56a to 56e and, similarly to the cam ring 40 of the variable-displacement unit, the cam surface of the cam ring 48 may be provided with an annular groove 49 for the reason previously discussed. The cam ring 48 is positioned relative to the associated cylindrical block 46 in a manner that a fixed degree of eccentricity is established between the cam ring 48 and the axis of rotation of the cylinder block 46, as clearly seen in FIG. 3. This cylinder block 46 is integral with the output shaft 22, as shown in FIG. 1.

First and second pressure distribution passage means are provided to transmit the torque from the variable-displacement unit 26 to the constant-displacement unit 28. These passage means are formed through provision of a valve sleeve 60 which is mounted between the input shaft 20 and the cylinder block 30 of the variable-displacement unit 26 and which is fast on the transmission housing 24. The first pressure distribution passage means comprises an elongated groove 62 formed longitudinally in the outer peripheral wall of the input shaft 20 and a circumferential port 64 which is formed in the outer peripheral wall of the valve sleeve 60 and which has a limited circumferential width as seen in FIG. 2. The elongated groove 62 merges at its end close to the cylinder block 30 of the variable-displacement unit 26 into an annular groove 66 which is formed circumferentially in the outer peripheral wall of the input shaft 20. The circumferential port 64, on the other hand, merges into a radial passage 68 formed in the valve sleeve 60. The annular groove 66 and the radial passage 68 are at least partly coextensive with each other so that communication is established between the circumferential port 64 and the elongated groove 62 when the annular groove 66 is aligned with the radial passage 68 as the input shaft 20 rotates within the valve sleeve 60. The elongated groove 62, futthermore, merges at its end closed to the cylinder block 46 of the constant-displacement unit 28 into a circumferential port 70 which is formed in the outer peripheral wall of the input shaft 20 and which has a limited circumferential width as indicated in FIG. 3. The second pressure distribution passage means, on the other hand, comprises an elongated bore 72 which is formed in the input shaft 20 and a circumferential port 74 which is formed in the outer peripheral wall of the valve sleeve 60 and which has a limited circumferential width as seen in FIG. 2.

This circumferential port 74 is diametrically opposed to the circumferential port 64 of the first pressure distribution passage means. This circumferential port 74 is at least partly coextensive with an annular groove 76 which is formed in the outer peripheral wall of the input shaft 20. This annular groove 76 communicates with the circumferential port 74 through a radial passage 78 formed in the valve sleeve 60 and with the bore 72 through a radial passage 80, thereby providing communication between the circumferential port 74 and the bore 72 in the input shaft. The input shaft 20 has in its outer peripheral wall adjacent the cylinder block 46 of the constant-displacement unit 28 a circumferential port 82 which has a limited circumferential width and which is diametrically opposed to the circumferential port 70 of the first pressure distribution passage means. The circumferential port 82 communicates with the bore 72 in the input shaft through a radial passage 84, thereby providing communication between the circumferential ports 74 and 82 through the bore 72 in the input shaft. The circumferential ports 64 and 74 of the first and second pressure distribution passage means communicate with fluid passages 86 and 88, respectively, which are formed in the transmission housing 24, as seen in FIG. 1. These fluid passages 86 and 88 are led from a source or sources of fluid under pressure and are respectively provided with one-way check valves to prevent leakage of the fluid when the fluid pressures reach the predetermined operating levels and with relief valves adapted to drain the fluid off when the fluid pressure rises to excess levels, though not illustrated.

The cylindrical chambers 36a to 36e of the variable-displacement unit 26 merges at their innermost ends into respective radial ports 90a to 90e which are opened to the valve sleeve 60. These radial ports provide fluid communication between some of the cylindrical chambers and the circumferential port 64 of the first pressure distribution passage means and between some of the cylindrical chambers and the circumferential port 74 of the second pressure distribution passage means as the cylinder block 30 rotates about its axis, as seen in FIG. 2. Likewise, the cylindrical chambers 54a to 54e of the constant-displacement unit 28 merge into respective radial ports 92a to 92e which are opened to the outer peripheral wall of the input shaft 20. These radial ports selectively provide fluid communication between some of the cylindrical chambers 54a to 54e and the circumferential port 70 of the first pressure distribution passage means and between some of these cylindrical chambers and the circumferential port 82 of the second pressure distribution passage means, as the cylinder block 46 rotates about its axis.

When, in operation, the input shaft 20 is driven for rotation, the cylinder block 30 is rotated through the key 32 interposed therebetween. This rotation of the cylinder block 30 is herein assumed to be a clockwise rotation in the cross sectional view of FIG. 2, as indicated by an arrowhead therein. This causes the ball piston elements 38a to 38e to move radially in the respective cylindrical chambers 36a to 36e with their outermost ends in sliding contact with the inner cam surface of the annular groove 42 therein of the cam ring 40. With the ball piston elements assumed to be in the angular positions shown in FIG. 2, the ball piston elements 38e and 38a are forced inwardly and the ball piston elements 38c and 38d are allowed outwardly, because of the eccentricity between the cam surface and the axis of rotation of the cylinder block 30 as illustrated. The ball piston element 38b is moved to its innermost position, forced against a ball seat (not numbered) defining the cylindrical chamber. As the ball piston element 38a is thus moved away from the axis of rotation of the cylinder block 30, the fluid in the cylindrical chamber 36a is forced into the circumferential port 64 in the sleeve 60 through the radial port 90a. The fluid is fed to the circumferential port 70 for the constant-displacement unit 28 via the radial passage 68, annular groove 66 and elongated groove 61 and enters the cylindrical chamber 54a of the unit 28 through the radial port 92a. The ball piston element 56a is consequently forced away from the axis of rotation of the cylinder block 46 by the pressure of the fluid in the chamber 54a. The piston element 56a is thus, forced against the inner cam surface of the cam ring 48 so that the cylinder block 46 is rotated as the cam ring 48 rotates with the cylinder block 30 of the variable-displacement unit 26. Concurrently as the ball piston elements 38a and 56a of the variable-displacement and constant-displacement units 26 and 28, respectively, are thus moved radially inwardly, the ball piston elements 38c and 56c are allowed outwardly due to the increasing gaps between the cylinder blocks 30 and 46 and the cam rings 40 and 48, respectively. The cylindrical chamber 36c is thus supercharged with the fluid fed from the fluid passage 88 via the circumferential port 74 and the cylindrical chamber 54c supercharged with the fluid fed from this circumferential port 74 through the annular groove 76 and the bore 72 in the input shaft 20.

Because, in this instance, the cam ring 48 of the constant-displacement unit 28 and the circumferential port 70 in the input shaft 20 are revolved at a common speed and because the degree of eccentricity between the cam surface of the ring 48 and the axis of rotation of the cylinder block 46 is fixed, the rotational speed of the output shaft 22, viz., the rotational speed of the cylinder block 46 of the constant-displacement unit 28 depends solely upon the amount of displacement of the fluid from the variable-displacement unit 26 to the constant-displacement unit 28 through the first pressure distribution passage means. The displacement of the fluid from the variable-displacement unit, in turn, depends upon the degree of eccentricity between the cam ring 40 and the cylinder block 30 of the unit, viz., upon the angular position of the cam ring 40 with respect to the cylinder block 30.

To aid in the clear understanding of the operation of the hydrostatic power transmission above described, it is herein assumed that the transmission has the following five modes of operation:

Mode A in which the displacement of the variable-displacement unit is adjusted so that it equals the displacement of the constant-displacement unit.

Mode B in which the displacement of the variable-displacement unit is decreased from the value in the Mode A to a lesser displacement.

Mode C in which the cam ring 40 is positioned-adjusted to be in concentric alignment with the associated cylinder block 30 so that the displacement of the variable-displacement unit becomes zero.

Mode D in which the displacement of the variable-displacement unit is further adjusted to decrease beyond the value in Mode C.

Mode E in which the displacement of the variable-displacement unit is adjusted in the opposite direction beyond the value in Mode A.

These different modes of operation of the hydrostatic power transmission shown in FIGS. 1 to 3, viz., the changes in the rotational speed of the cylinder block 46 of the constant-displacement unit as a result of the changes in the displacement of the variable-displacement are now diagrammatically indicated in FIGS. 4A to 4E in which the rotary motions of th cylinder blocks of the two units are translated into rectilineal movements of reciprocating pistons in piston cylinders of a simulated power transmission. The simulated power transmission thus consists of a variable-displacement unit 260 having a piston cylinder 360 and a piston 380 and a constant-displacement unit 280 having a piston cylinder 540 and a piston 560. Th piston cylinder 360 is divided by the piston 380 into chambers 360a and 360b while the piston cylinder 540 is divided by the piston 560 into chambers 540a and 540b. The chamber 360a communicates with the chamber 540a through a passage 620 (indicated in solid lines) and the chamber 360b communicates with the chamber 540b through a passage 720 (indicated in broken lines) in figures excepting FIG. D. In FIG. D, the chambers 360a and 540b are connected by a passage 720' and the chambers 360b and 540a interconnected by a passage 620', as indicated in broken lines. The piston 380 of the variable-displacement unit 260 is connected to a transmission housing 240 through a shaft 400 and the piston cylinder 360 is connected to the piston 560 of the constant-displacement unit 280 through a shaft 480 so as to be movable relative to the cylinder 540. The cylinders 360 and 540 are connected to input and output shaft 200 and 220, respectively. The piston 560 of the constant-displacement unit 280 is thus moved back and forth by the input shaft 200 through the cylinder 360 of the variable-displacement unit and the shaft 480. The variation in the diameter of the piston cylinder 360 of the variable-displacement unit 360 represents the variation in the displacement of the corresponding unit in the actual transmission shown in FIGS. 1 and 2. Thus, FIGS. 4A to 4E correspond to Modes A to E above defined.

Figure 4A:
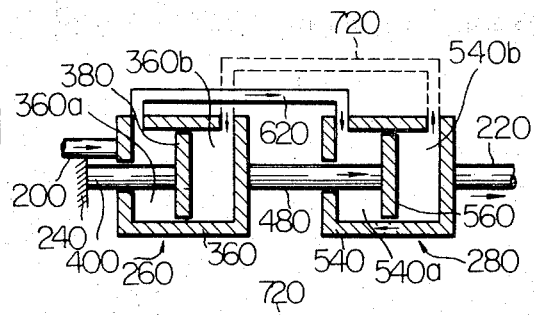
FIGS. 4A, 4B, 4C, 4D and 4E are diagrammatic view simulating the modes of operation of the hydrostatic power transmission shown in FIG. 1.
Figure 4B:
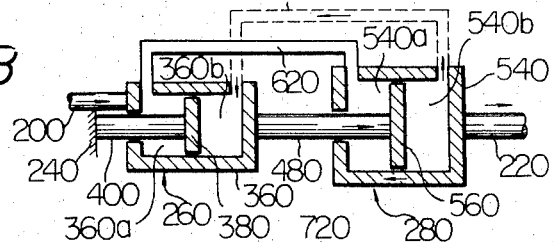
Figure 4C:
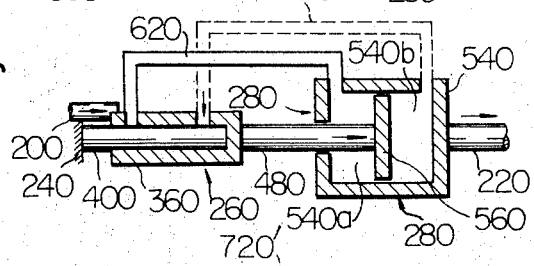
Figure 4D:
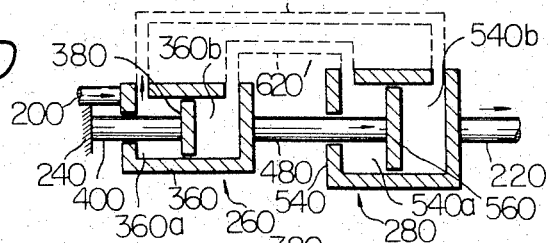
Figure 4E:
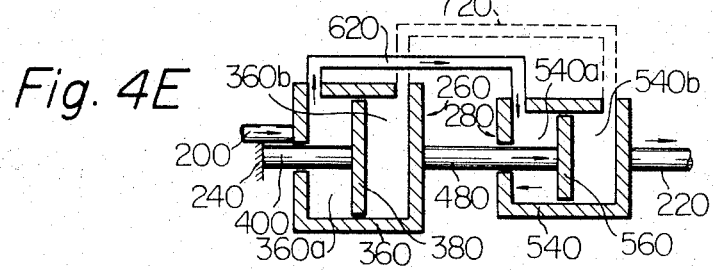

Assuming that the input and output shafts 200 and 220 are driven at speeds $N_1$ and $N_2$, respectively, and that rates of the variation in volume of the fluid in the variation in volume of the fluid in the variable-displacement and constant-displacement units 260 and 280 are $V_1$ and $V_2$, respectively, per unit amount of displacement of each of the pistons 380 and 560 relative to the associated cylinders 360 and 540, the fluid is delivered from the chamber 360a to the passage 620 at a rate of $V_1 \cdot N_1$ per unit time and the fluid thus delivered to the passage 620 is passed to the chamber 540a at a rate of $V_2(N_1 - N_2)$ per unit time under the modes of operation shown in FIGS. 4A, 4B and 4E. These rates must be equal to each other so that the following equations hold:

$$V_1 \cdot N_1 = V_2(N_1 - N_2)$$

hence, $$N_2 = (1 - (1/V_2)) N_1$$

If, thus, $V_1 = V_2$ as indicated in FIG. 4A, then $N_2 = 0$ so that no power output is delivered to the output shaft and the transmission is held in a neutral condition. (Mode A)

If $0 < V_1 < V_2$ as indicated in FIG. 4B, then $N_1 > N_2 > 0$ so that the output shaft is driven at a speed lower than the speed of the input shaft. (Mode B)

If $V_1 = 0$ as indicated in FIG. 4C, then the fluid flow path is interrupted so that $N_1 = N_2$.

The variable-displacement and constant-displacement units thus act as a pump and a motor, respectively, under those conditions which correspond to Modes A to C. If these units operate conversely as a motor and a pump with the inlet and outlet ports of the piston cylinder of the variable-displacement unit conversed to each other as seen in FIG. 4D, then $V_1 < 0$ so that $N_2 > N_1$ establishing an overdrive condition in the transmission. (Mode D)

If, lastly, $V_1 > V_2$ as indicated in FIG. 4E, then $N_2 < 0$ as is evident from the above equation so that the constant-direction of the motion of the variable-displacement unit, establishing a reverse drive. (Mode E)

With the above discussion in mind, reference is again made to FIGS. 1 to 3.

When the transmission shown in FIGS. 1 to 3 operates under the previously defined Mode A which the cam ring 40 is adjusted in a manner to make the displacement of the variable-displacement and constant-displacement units 26 and 28, respectively, equalized to each other, no fluid pressure is carried to the cylindrical chamber 54a in the cylinder block 46 of the constant-displacement unit 28 so that the cylinder block 46 and accordingly the output shaft 22 are held at a standstill. The transmission in its entirety is thus maintained in a neutral condition, as previously mentioned.

Under Mode B in which the displacement of the variable-displacement unit 26 is decreased from the neutral value and consequently becomes smaller than the displacement of the constant-displacement unit 28 a fluid pressure develops in the fluid chamber 54c of the constant-displacement unit so that the fluid under pressure is now passed from this chamber 54c to the chamber 54a which is approximately diametrical to the former, thus assisting in the rotational motion of the cylinder block 46 of the unit 28. The speed ratio between the input and output shafts is in this manner decreased progressively, providing a so-called deceleration condition. In this deceleration condition, the constant-displacement unti 28 acts as a pump while the variable-displacement unit 26 acts as a hydraulic motor.

When the cam ring 40 of the variable-displacement unit 26 is adjusted to be concentrical with the associated cylinder block 30 so that the transmission operates in Mode C, then the displacement of the variable-displacement unit 26 becomes zero and accordingly a hydraulic lock is established in the constant-displacement unit 28. The transmission now acts as an integral unit so that the output shaft 22 is completely coupled with the input shaft 20.

When the cam ring 40 of the variable-displacement unit 26 is further adjusted so as to have the displacement of the variable-displacement unit 26 reduced to minus values, the fluid in the cylindrical chamber 36c which is roughly diametrically opposed to the chamber 36a of the variable displacement unit is passed to the cylindrical chamber 54a of the constant-displacement unit 28 through the circumferential port 74 in the sleeve 60, the bore 72 in the input shaft 20 and the cylindrical chamber 54c of the constant-displacement unit. The cylinder block 46 of the constant-displacement unit overruns the cam ring 48 with the result that the output shaft 22 is driven at a higher speed than the rotational speed of the input shaft. An overdriving condition is thus achieved in Mode D.

With the cam ring 40 of the variable-displacement unit 26 conditioned so that the displacement unit 26 is adjusted in the opposite direction beyond the neutral condition, the ball piston elements 56a to 56e of the constant-displacement unit 28 are caused to revolve in a direction opposite to the direction of rotation of the associated cam ring 48 whereby the cylinder block 46 of the output shaft 22 is rotated in a direction opposite to the direction of rotation of the input shaft 20. Mode E thus establishes reverse drive.

It may be noted that the positional relationship between the cam ring 48 of the constant-displacement unit 28 and the grooves, ports and passages formed in the input shaft 20 is kept unchanged because the cam ring 48 and the input shaft 48 rotate together.

The hydrostatic power transmission shown in FIGS. 1 to 3 is thus capable of varying the speed ratio between the input and output shafts steplessly in either direction from zero to maximum under various modes of operation through adjustment of the adjustable cam ring of the variable-displacement unit. Such adjustment of the adjustable cam ring may be effected in any desired manner insofar as the varying operational requirements imposed on the transmission are met continuously. FIG. 2 further illustrates a preferred example of the actuating means which is adapted to automatically adjust the cam ring by means of a minimum and mechanical operating effort.

Turning back to FIG. 2, the actuating means for the cam ring 40 of the variable-displacement unit 26 includes a piston cylinder 94 having opposite end walls 96 and 98 and a piston 100 which is slidable in the cylinder toward and from the end walls thereof. The piston cylinder 94 is internally divided by the piston 100 into two chambers 102 and 104. Into these chambers 102 and 104 are opened fluid passages 106 and 108 through ports 110 and 112, respectively. These fluid passage 106 and 108 are branched from a main fluid passage 114 leading from a source (not shown) of fluid under pressure. Restrictions or orifices 116 and 118 are disposed in the branch fluid passage 112 and 114, respectively, so that the fluid under pressure is passed to the chambers 102 and 104 at limited rates. Bored piston rods 120 and 122 project from both faces of the piston 100, extending movably outwardly of the cylinder 94 through the opposite end walls 96 and 98 thereof. The piston rod 120 extending through the end wall 96 has formed therein an axial bore 124 while the piston rod 122 has an axial bore 126 which terminates at a closed leading end (not numbered) of the piston rod 122. A rod valve 128 extends into the bore 126 in the piston rod 122 through the bore 124 in the piston rod 120 and a central aperture (not numbered) formed in the piston 100. The two piston rods 120 and 122 being aligned together, the bore 124 in the piston 120, the central aperture in the piston 100 and the bore 126 in the piston rod 122 are all in line with each other. Spaced annular grooves 130 and 132 are formed in an inner peripheral wall of the piston 100 defining the central aperture therein. These annular grooves 130 and 132 communicate with the chambers 102 and 104 through passages 134 and 136, respectively, which are formed in the piston 100 as shown. The rod valve 128 has formed therein an axial bore 138 which is opened into the bore 126 in the piston rod 122. This rod valve 128 further has formed in its outer peripheral wall an elongated groove 140 communicating with the bore 138 through a passage 142 which is also formed in the rod valve. The elongated groove 140 and the passage 142 are located relative to the piston 100 in such a manner that they intervene between the annular grooves 130 and 132 when the rod valve is in a neutral position. The bore 138 in the piston rod 122 is opened to the outside through a drain port 144.

The piston rod 122 is in operative engagement with the cam ring 40 of the variable-displacement unit 26 through a connecting member 146, which interconnects the piston rod 122 and the cam ring 40 through pins 148 and 148'. The rod valve 128, on the other hand, is connected to suitable control means which is adapted to move the rod valve back and forth within the piston 100 and the piston rods 120 and 122 in response to the operational conditions of the automotive vehicle on which the hydrostatic power transmission is installed.

When, now, the actuating means thus constructed is held in the neutral position which is shown in FIG. 2, the piston 100 has its opposite faces subjected to a common fluid pressure which is passed to the chambers 102 and 104 of the cylinder from the main fluid passage 114 through the restricted branch passages 110 and 112, respectively. The piston 100 and accordingly the piston rods 120 and 122 are, therefore, held at a standstill with the elongated groove 140 in the rod valve 128 closed by the central annular rim between the annular grooves 130 and 132 in the piston. If, in this condition, the rod valve 128 is moved toward the end wall 98 of the cylinder 94, then the elongated groove 140 is permitted to communicate with the annular groove 132 in the piston 100 so that the fluid in the chamber 104 is drained through the passage 136, annular groove 132, elongated groove 140, passage 142, bore 138 in the rod valve 128, bore 126 in the piston rod 128 and drain port 144, in this sequence. The chamber 104 is replenished with the fluid through the branch passage 112 but, since the rate of flow of the fluid through this branch passage is restricted by the orifice 118 and is consequently lower than the rate of the flow through the drain port 144, the fluid pressure in in chamber 104 decreases progressively so that the piston 100 is forced toward the end wall 98 under the influence of the fluid pressure obtaining in the chamber 102 until the elongated groove 140 is closed by the central annular rim between the annular grooves 130 and 132 in the piston. This causes the cam ring 40 to turn about the pin 44 through the connecting member 146 with the result that the degree of eccentricity between the cam surface of the cam ring 40 and the axis of rotation of the cylinder block 30 is diminished with consequent reduction in the displacement of the fluid from the variable-displacement unit 26. The movement of the piston 100 is the opposite direction and the resultant motion of the cam ring 30 are brought about in a manner similar to that above described and, therefore, no discussion thereabout will be herein incorporated.

It will now be appreciated from the foregoing description that the hydrostatic power transmission forming part of the hydromechanical power transmission system according to this invention is capable of providing various modes of operation over a stepless range simply by regulating the angular position of the cam ring of the variable-displacement unit. Such transmission system is specifically adapted for use with an automotive engine designed for air-pollution preventive purposes. The transmission system, however, will be well compatible with a gas turbine engine operating at an elevated speed during idling, because of its ability to achieve neutral, forward and reverse driving conditions steplessly. The regulation of the angular position of the cam ring of the variable-displacement unit can be effected by a minimum of operating effort without resort to supply of supplementary mechanical power, because only a limited amount of reaction is imparted to the rod valve of the actuating means. The pressurized fluid acting upon the piston to drive the cam ring is varied minutely in the cylinder chambers so that the cam ring can be moved softly and continually, thus preventing the variable-displacement unit from being subjected to shocks and impacts during operation.

Figure 5:
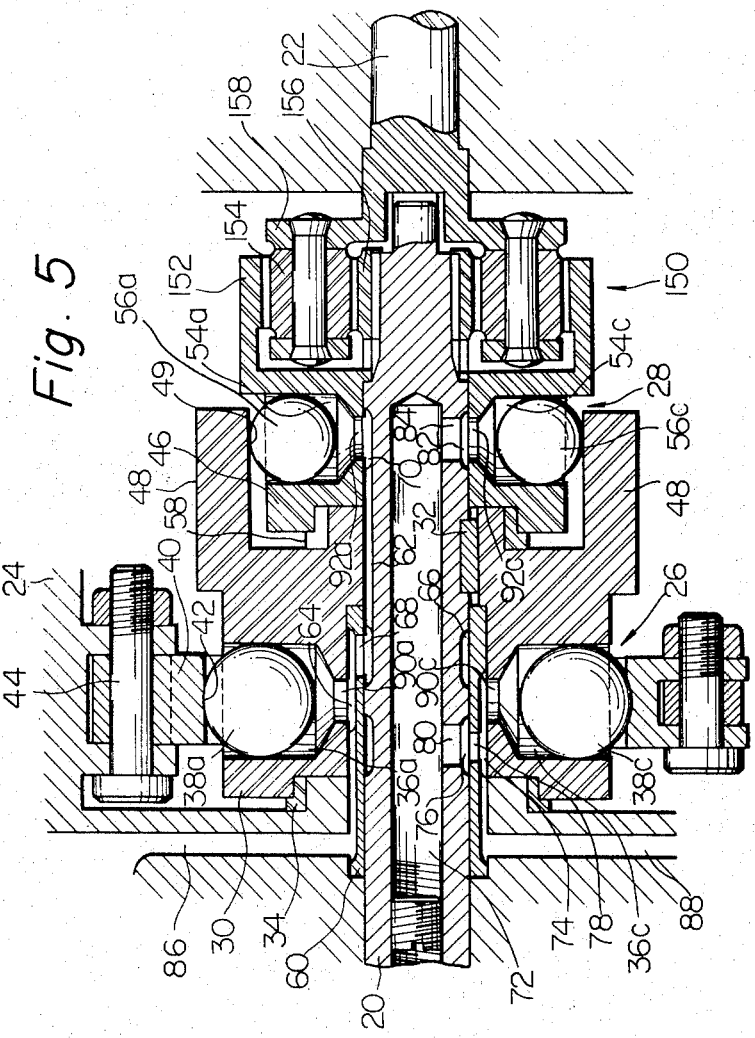
FIG. 5 is a sectional view showing an overall construction of the hydromechanical power transmission system using the hydrostatic transmission shown in FIG. 1 and a planetary gear train which is combined therewith.

These advantages of the hydrostatic transmission are amplified in the hydromechanical power transmission system implementing this invention in which the hdyrostatic transmission is combined with a planetary gear train, a preferred embodiment of the transmission system being shown in FIG. 5.

In the embodiment shown, the power output of the hydrostatic transmission is delivered to the output shaft through the planetary gear grain which is generally denoted by reference numeral 150. The planetary gear train 150 comprises an internally toothed ring gear 152, at least one planet pinion 154 meshing with the ring gear, and a sun gear 156 meshing with the planet pinion. The ring gear 152 is integral with the cylinder block 46 of the constant-displacement unit 28 of the hydrostatic transmission, while the sun gear 156 is connected to the input shaft 20. The planet pinion 154 is connected to the output shaft 22 through a pinion carrier 158, as shown.

Figure 6:
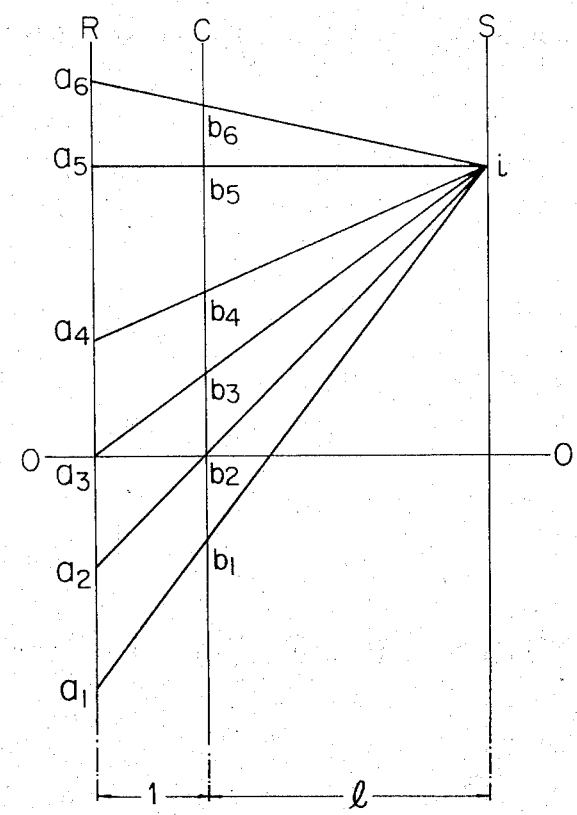
FIG. 6 is a diagram indicating relations among the relative speeds of rotation of the rotary elements of the planetary gear train shown as part of the transmission system illustrated in FIG. 5.

The relations among the relative speeds of revolution of the rotary elements of the planetary gear train 150 are shown in the diagram of FIG. 6, in which the three axes R, C and S of ordinate respectively indicate the revolution speeds of the ring gear 152, carrier 158 and sun gear 156. The axes R and S are spaced apart from the axis C in a ratio of 1 : 1 in which the value $l$ represents a ratio of the number of teeth of the ring gear 152 to the number of teeth of the sun gear 156. The points at which the axes R, C and S intersect an axis O—O of abscissa represent fixed or stationary conditions of the respective rotary elements. The points on the axes R, C and S over this axis O—O of abscissa thus indicate the speeds or revolution in a forward direction (i. e., the direction of rotation of the input shaft 20) of the rotary elements, while the points on the axes R, C and S below the axis O—O refer to the speeds of revolution in a reverse direction of the rotary elements. With the convention thus made, the speeds of the rotary elements in a given operating condition of the planetary gear train are represented by those points on the axes R, C and S which are situated on a single straight line. The revolution speed $i$ of the sun gear 156 depends upon the speed of rotation of the input shaft 20 while the revolution speed $a$ of the ring gear 152 is dictated by the speed of rotation of the cylinder block 46 of the constant-displacement unit 28. If, in this instance, the revolution speed $a$ of the ring gear 152 is varied from $a_1$ to $a_6$ through $a_2$, $a_4$ and $a_5$ with the revolution speed of the sun gear 156 fixed at $i$ as illustrated, then the revolution speed $b$ of the carrier 154 and accordingly the output shaft 22 varies from $b_1$ to $b_6$ through $b_2$, $b_3$, $b_4$ and $b_5$, respectively. Thus, a reverse drive condition is established when the ring gear 152 is rotated at a speed ranging from $a_1$ to $a_2$. The transmission system delivers no power output when the ring gear 152 is rotated at speed $a_2$. A deceleration condition is achieved when the ring gear is driven at a speed ranging from $a_2$ to $a_5$. When the speed of the ring gear reaches $a_5$, then the transmission system in its entirety operates as an integral unit so that the power from the input shaft 20 is transmitted to the output shaft 22 as it exactly is. An acceleration condition is established when the ring gear is rotated at a speed intervening between $a_5$ and $a_6$.

Figure 7:
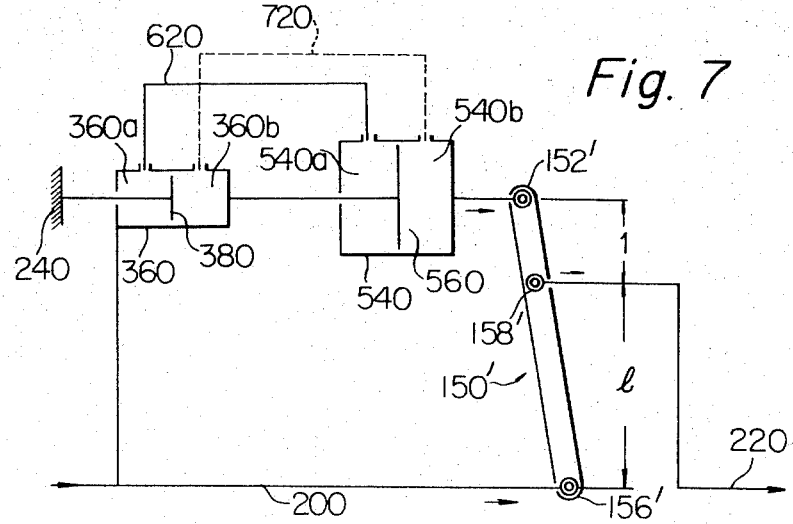
FIG. 7 is a diagrammatic view indicating the basic mode of operation of the transmission system shown in FIG. 5.

The operation of the hydromechanical transmission system shown in FIG. 5 is simulatively illustrated in FIG. 7, in which the rotational motions in the actual transmission system are translated into rectilinear movements of functionally corresponding parts and elements. The planetary gear train 150 is herein simulated as a lever 150' having three spaced working points 152', 156' and 158' which respectively correspond to the ring gear 152, sun gear 156 and pinion carrier 158. The points 152' and 156' are spaced from point 158' in a ratio of 1 : $l$. As will be understood from this simulative diagram. The power to be transmitted to the output shaft 22 is the sum of the power component transmitted from the sun gear 156 to the planet pinion 154 and the power component transmitted from the ring gear 152 to the planet pinion 154. The ratio of the torque transmitted by the sun gear 156 to the torque transmitted by the ring gear 152 is 1 : $l$ and, since the sun gear and the planet pinion are drive at speeds $i$ and $a$, the ratio between the powers transmitted thereby can be expressed as $i : la$. The output shaft 22 thus receives a power corresponding to $i + la$. Although the power $i$ which is mechanically transmitted through the sun gear 156 is maintained constant, the power $la$ transmitted through the hydrostatic transmission varies with the value $a$. Since, moreover, a loss in the power mechanically transmitted through the sun gear 156 is limited, the loss in the power transmitted by the transmission system as a whole is considerably smaller than the loss which would be created where the hydrostatic transmission alone is used. The use of the planetary gear train in combination with the hydrostatic transmission is also advantageous because an increased transmission capacity is available in the resultant hydromechanical transmission system by the additional transmission capacity of the planetary gear train which in itself is simple in construction.

Figure 8:
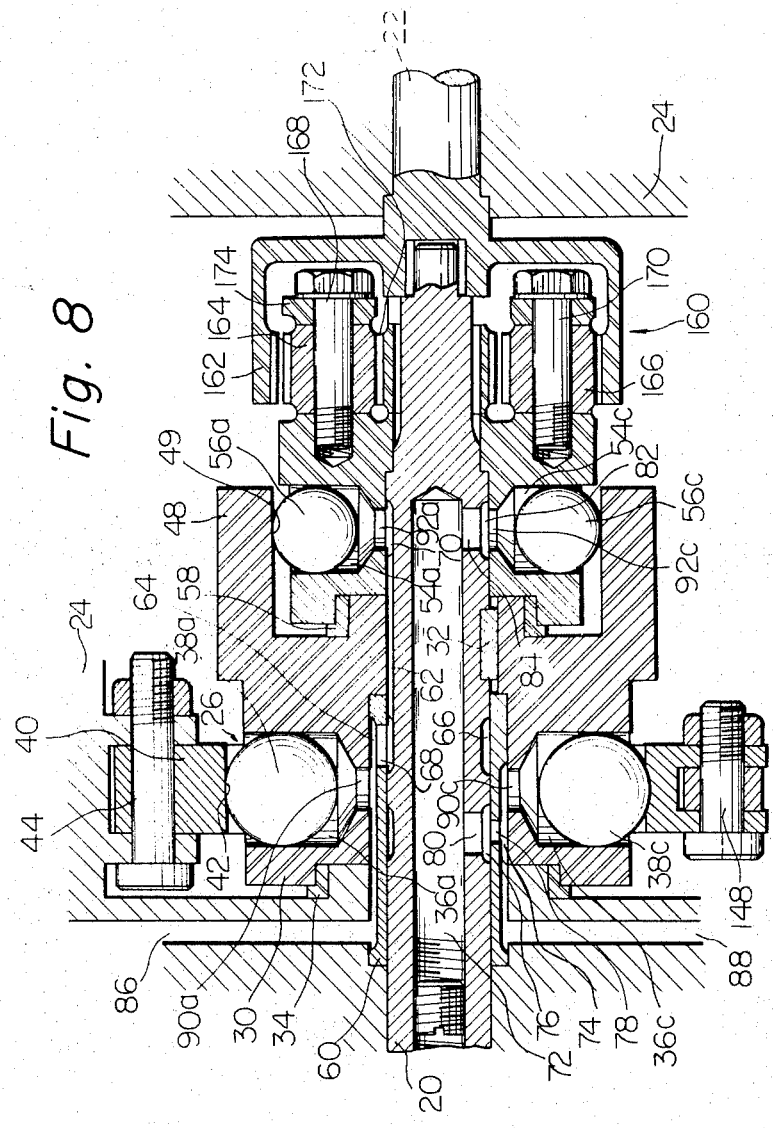
FIG. 8 is a view similar to FIG. 5 but showing another form of the hydromechanical power transmission system according to this invention.

The planetary gear train forming part of the hydromechanical power transmission system according to this invention may be utilized in manners other than that shown in FIG. 5. FIG. 8 illustrates an example of such modified hydromechanical transmission system in which the planetary gear train uses two different planet pinions. The planetary gear train, generally designated by reference numeral 160, now includes an internally toothed ring gear 162, first and second planet pinions 164 and 166 carried by pinion carriers 168 and 170, respectively, and a sun gear 172. The ring gear 162 is integral with the output shaft 22. The first planet pinion 164 is in mesh with the sun gear 172 while the second planet pinion 166 is in mesh with both the first planet pinion 164 and the ring gear 162. The sun gear 172 is connected to and driven by the input shaft 20, as illustrated. Designated by reference numeral 174 is a retainer plate which is secured, together with the pinion carriers 168 and 170, to the cylinder block 46 of the constant-displacement unit 28 of the hydrostatic transmission whereby the planet pinions 164 and 166 are prevented from dislocated from the operating positions.

Figure 9:
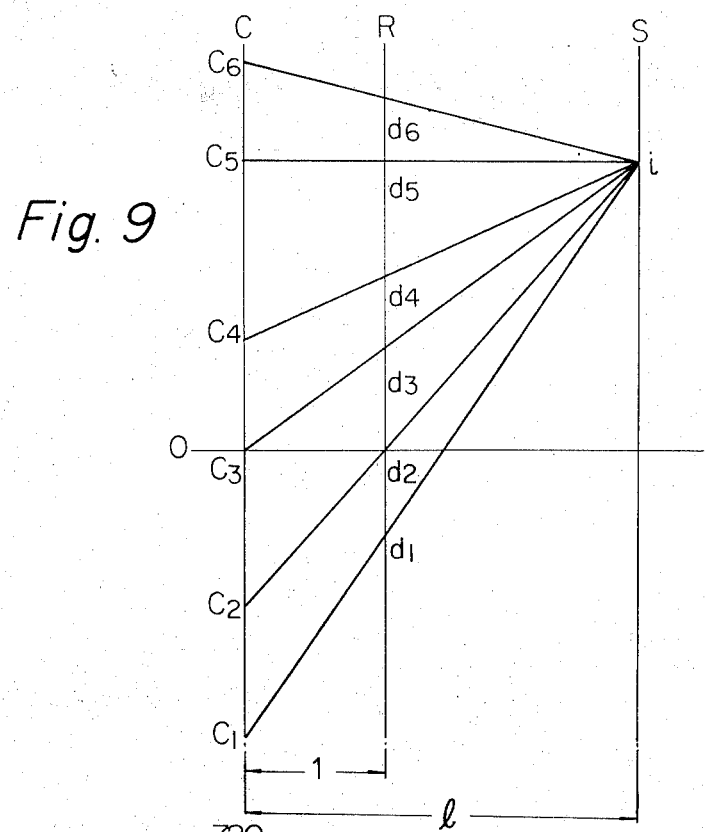
FIG. 9 is a diagram indicating relations among the relative speeds of rotation of the rotary elements of the planetary gear train incorporated in the transmission system shown in FIG. 8.

The relations among the revolution speeds of the rotary elements of the planetary gear train 160 are shown in the diagram of FIG. 9, in which the axes C, R and S of ordinate designate revolution speeds of the carriers 168 and 170 and accordingly the cylinder block 46 of the constant-displacement unit, ring gear 162 and sun gear 172, respectively. Different from the diagram of FIG. 6, the axes R and S are situated on the same side with respect to the axis C and are spaced apart therefrom in a ratio of 1 : $l$. This is because of the fact that, if the sun gear 172 is rotated a full turn with the carriers 168 and 170 held stationary, then the ring gear 162 rotates in the same direction and at an angle proportional to the ratio between the numbers of teeth of the sun gear and the ring gear. If, as a result, the sun gear 172 is rotated with the input shaft 20 at speed $i$ and the carriers 168 and 170 are rotated with the cylinder block 46 of the constant-displacement unit at increasing speeds $c_1$ $c_2$, $c_3$, $c_4$, $c_5$ and $c_6$, then the output shaft 22 is rotated with the ring gear 162 at speeds $d_1$, $d_2$, $d_3$, $d_4$, $d_5$ and $d_6$, respectively.

Figure 10:
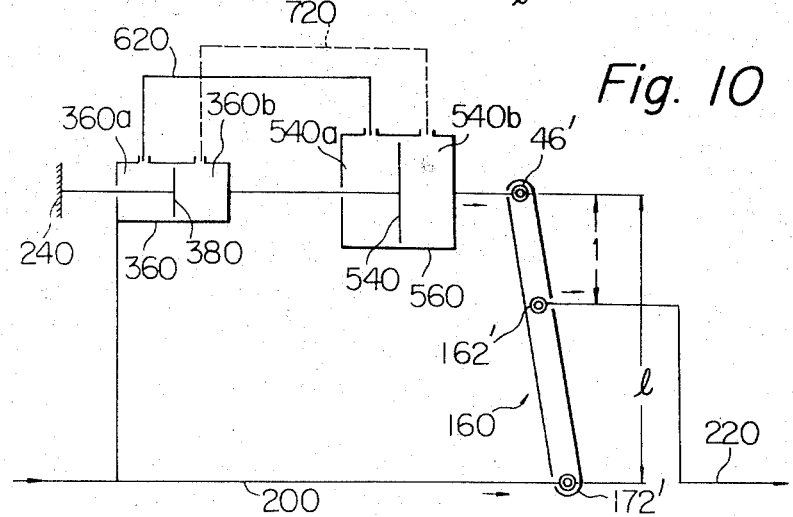
FIG. 10 is a diagrammatic view showing the basic mode of operation of the transmission system illustrated in FIG. 8.

FIG. 10 is a simulative diagram showing an operation of the hydromechanical power transmission system shown in FIG. 8. This diagram is essentially similar to the diagram of FIG. 7 except in that the planetary gear train 160 is simulated as a lever 160' having spaced points 162' and 172' corresponding to the ring and aun gears 162 and 172', respectively, which are situated on the same side to point 46' corresponding to the cylinder block 46 or the carriers 168 and 170. The point 162' corresponding to the ring gear 162 is connected to the output shaft 220. Thus, the ratio between the mechanically and hydraulically transmitted power components is expressed as $i : (l - 1)c$, in which the value $c$ represents the revolution speed of the cylinder block 46 of the constant-displacement unit. The power transmission efficiency of the transmission system shown in FIG. 10 is higher than that attained in the system shown in FIG. 5.

Figure 11:
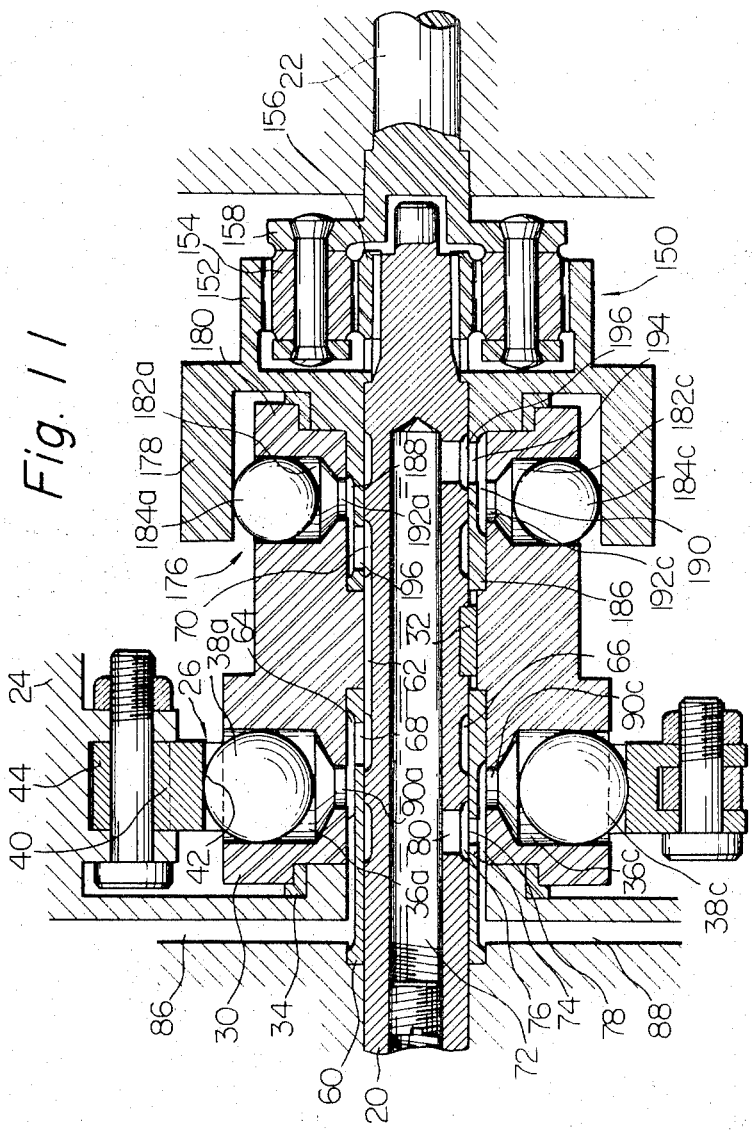
FIG. 11 is also similar to FIG. 5 but now shows still another form of the hydromechanical power transmission according to this invention.
Figure 12:
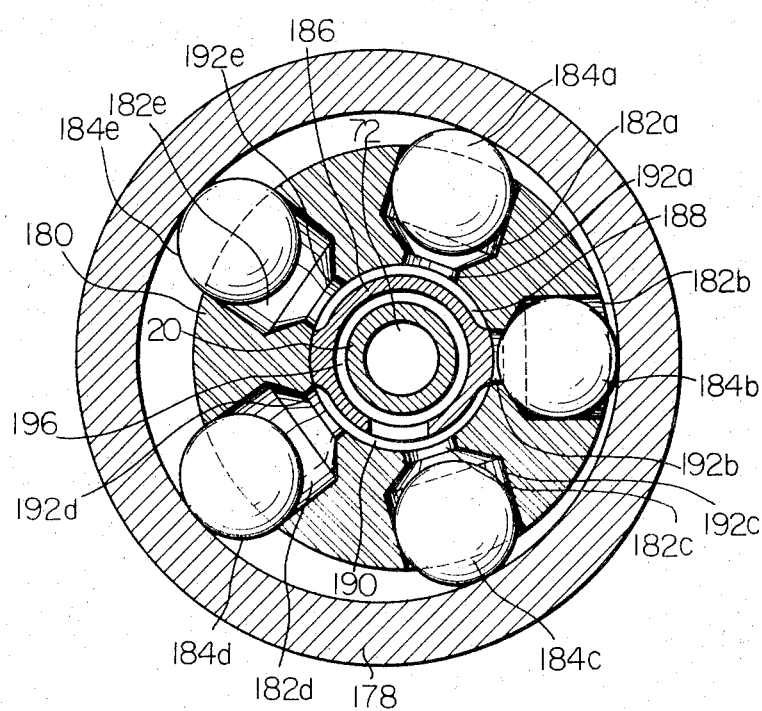
FIG. 12 is a cross sectional view illustrating the constant-displacement unit of the hydrostatic transmission shown in FIG. 11.

FIGS. 11 and 12 illustrate a third preferred embodiment of the mechanical power transmission system according to this invention. The transmission system herein shown is constructed in a manner that the relationship between the cylinder block 46 and the ball piston elements 56a to 56e of the constant-displacement unit 28 of the first embodiment is inverted whereby the cylinder block of the constant displacement unit is driven by the variable-displacement unit and the ring gear of the planetary gear train is driven by the cam ring of the constant-displacement unit. The planetary gear train used in the transmission system shown in FIGS. 11 and 12 is exemplified, for convenience sake, as identical in construction with the planetary gear train of the system shown in FIG. 5 but it is apparent that any planetary gear train including that used in the embodiment shown in FIG. 8 may be substituted therefor.

Referring to FIGS. 11 and 12, the constant-displacement unit, generally designated by reference numeral 176, includes a cam ring 178 which in itself is similar to the cam ring 48 of the construction shown in FIG. 5 but which is now integral with the ring gear 152 of the planetary gear train 150. The cam ring 178 surrounds a cylinder block 180 which, in this instance, is integral with the cylinder block 30 of the variable-displacement unit 26, as illustrated. The cylinder block 180 has formed therein a plurality of substantially equidistantly spaced radial cylindrical chambers 182a and 182e which are herein shown as five in number by way of example. These cylindrical chambers 182a to 182e receive therein ball piston elements 184a to 184e, respectively, which are movable toward and away from an axis of rotation of the cylinder block 180. A valve sleeve 186 is positioned between the input shaft 20 and the cylinder block 180 in a manner to be rotatable with the cam ring 178 and accordingly with the ring gear 152 of the planetary gear train. This valve sleeve 186 has formed in its outer peripheral wall spaced circumferential ports 188 and 190 which communicate, when the cylinder block 180 assumes that shown angular position, with the cylindrical chambers through radial ports 192a and 192e formed in the cylinder block to open into the cylindrical chambers 182a and 182c, respectively. The circumferential port 188, furthermore, communicates with the circumferential port 70 through a passage 196 so as to establish fluid communication between the elongated groove 62 and the cylindrical chamber 182a. The circumferential port 190, on the other hand, communicates with the radial passage 194 through an annular groove 196 formed in an outer peripheral wall of the input shaft 20, thereby providing fluid communication between the bore 72 in the input shaft and the cylindrical chamber 182c. The hydromechanical power transmission system operates in a manner essentially similar to the transmission systems previously described and, as such, the discussion given therefore will apply to the system herein shown.

It will now be appreciated from the foregoing description tha the hydromechanical power transmission system according to this invention has, in addition to the features available in the hydrostatic power transmission as formerly pointed out, outstanding advantages over the prior art hydrostatic power transmissions which are void of the mechanical power transmission unit such as the planetary gear train. Since, for instance, no clutches and geared reduction mechanisms are used in the transmission system according to this invention, the transmission system in its entirety can be of simple and compact construction which is economical to manufacture. Because, moreover, a portion of the power to be transmitted is passed through an extension of a single input shaft, a greater transmission capacity can be attained than in the prior art hydrostatic power transmissions. If, therefore, a certain transmission capacity is required of the transmission system, the system according to this invention can be of considerably small-sized construction. As compared with a transmission using parallel transmission shafts, the transmission system according to this invention has its input and output shafts, hydrostatic transmission unit and planetary gear train positioned in line with each other and, thus, can be constructed more compactly.

What is claimed is:

1. A hydromechanical power transmission system comprising, in combination, a hydrostatic power transmission which includes a variable-displacement unit driven by an input shaft and a constant-displacement unit; each of said units comprising a rotatable cylinder block and a cam ring having an inner cam surface positioned around said cylinder block, said cylinder block having a plurality of substantially equidistantly spaced cylinders which are directed toward an axis of rotation of said cylinder block and a plurality of ball piston elements which are respectively received in said cylinders, said ball piston elements being movable toward and away from the axis of said cylinder block and in sliding engagement with the cam surfaces of the cam rings of the variable-displacement and constant-displacement units, said cylinder block of said variable-displacement unit being integral with one of said cylinder block and said cam ring of said constant-displacement unit, said cam ring of said variable-displacement unit being pivotally supported to be rockable in a plane transverse to the axis of rotation of said cylinder block of said variable-displacement unit, the position of an axis of said cam ring of said constant-displacement unit being constant in respect to said cylinder block thereof, actuating means which is operable to displace the cam ring of said variable-displacement unit in a plane transverse to the axis of rotation of the associated cylinder block for providing controlled degrees of eccentricity between the cam and said axis of rotation of the cylinder block of the variable-displacement unit, first pressure distribution passage means for providing fluid communication between those cylinders of the variable-displacement and constant-displacement units in which the ball piston elements received therein are moved toward the axes of rotation of the cylinder blocks of said units as they revolve on the respective cam surfaces of the cam rings of said units, and second pressure distribution passage means for providing fluid communication between those cylinders of said variable-displacement and constant-displacement units in which the ball piston elements received therein are moved away from said axes of rotation of said cylinder blocks of said units, and a plantary gear train including a first rotary element driven by said input shaft, a second rotary element driven by said constant-displacement unit and a third rotary element connected to said output shaft.

2. A hydromechanical power transmission system comprising, in combination, a housing through which an input shaft and an output shaft extend, a hydrostatic power transmission which includes a variable-displacement unit having a cylinder block rotatable with said input shaft, said cylinder block being formed with a plurality of substantially equidistantly spaced cylindrical chambers which are directed toward an axis of rotation of said cylinder block, a plurality of ball piston elements respectively received in said cylindrical chambers and movable therein toward and away from said axis, and an adjustable cam ring positioned around said cylinder block and pivotally connected to said housing for being rockable in a plane transverse to said axis, said adjustable cam ring having an inner cam surface with which said ball piston elements are in sliding engagement, a constant-displacement unit having a cylinder block rotatable on said input shaft and formed with a plurality of substantially equidistantly spaced cylindrical chambers directed toward an axis of rotation of said cylinder block of said constant-displacement unit, a plurality of ball piston elements respectively received in said cylindrical chambers of said constant-displacement unit and movable toward and away from the axis of rotation of the cylinder block of said constant-displacement unit and a rotary cam ring positioned around said cylinder block of the constant-displacement unit and having an inner cam surface with which said ball piston elements of the constant-displacement unit are in sliding engagement, said rotary cam ring being integral with said cylinder block of said variable-displacement unit, first pressure distribution passage means for providing fluid communication between those cylindrical chambers of said variable-displacement and constant-displacement units in which the ball piston elements received therein are moved toward the axes of rotation of the cylinder blocks of the variable-displacement and constant-displacement units as they revolve on the respective cam surfaces of the cam rings, second pressure distribution passage means for providing fluid communication between those cylindrical chambers of said variable-displacement and constant-displacement units in which the ball piston elements received therein are moved away from said axes of rotation of said cylinder blocks, and actuating means which is operable to displace said adjustable can ring in said plane for providing controlled degrees of eccentricity between said adjustable cam ring and the axis of rotation of tha associated cylinder block, and a planetary gear train comprising a sum gear rotatable with said input shaft, at least one planet pinion meshing with said sun gear and connected to said output shaft through a pinion carrier, and an internally toothed ring gear meshing with said planet pinion and rotatable with said constant displacement cylinder block.

3. A hydromechanical power transmission system comprising, in combination, a housing through which an input shaft and an output shaft extend, a hydrostatic power transmission which includes a variable-displacement unit having a cylinder block rotatable with said input shaft, said cylinder block being formed with a plurality of substantially equidistantly spaced cylindrical chambers which are directed toward an axis of rotation of said cylinder block, a plurality of ball piston elements respectively received in said cylindrical chambers and movable therein toward and away from said axis, and an adjustable cam ring positioned around said cylinder block and pivotally connected to said housing for being rockable in a plane transverse to said axis, said adjustable cam ring having an inner cam surface with which said ball piston elements are in sliding engagement, a constant-displacement unit having a cylinder block rotatable on said input shaft and formed with a plurality of substantially equidistantly spaced cylindrical chambers directed toward an axis of rotation of said cylinder block of the constant-displacement unit, a plurality of ball piston elements respectively received in said cylindrical chambers of the constant-displacement unit and movable toward and away from the axis of rotation of the cylinder block of the constant-displacement unit and a rotary cam ring positioned around the cylinder block of the constant-displacement unit and having an inner cam surface with which said ball piston elements of the constant-displacement unit are in sliding engagement, said rotary cam ring being integral with said cylinder block of said variable-displacement unit, first pressure distribution passage means for providing fluid communication between those cylindrical chambers of said variable-displacement and constant-displacement units in which the ball piston elements received therein are moved toward the axes of rotation of the cylinder blocks of the two units as they revolve on the respective cam surfaces of the cam rings, second pressure distribution passage means for providing fluid communication between those cylindrical chambers of the variable-displacement and constant-displacement units in which the ball piston element received therein are moved away from the axes of rotation of the cylinder blocks, and actuating means operable to displace said adjustable cam ring in said plane for providing controlled degrees of eccentricity between the adjustable cam ring and the axis of rotation of the associated cylinder block, and a planetary gear train comprising a sun gear rotatable with said input shaft, first and second planet pinions in mesh with each other and rotatable with said cylinder block of said constant-displacement unit through a carrier, and an internally toothed ring gear meshing with said second planet pinion and rotatable with said output shaft.

4. A hydromechanical power transmission system according to claim 1, further comprising a valve sleeve which is mounted between said input shaft and said cylinder block of said variable-displacement unit and secured to said housing, said first pressure distribution passage means being formed by a first circumferential port formed in an outer peripheral wall of said valve sleeve and leading from a source of fluid under pressure, said first circumferential port communicating with a limited number of the cylindrical chambers of said variable-displacement unit as the associated cylinder block rotates with said input shaft, an annular groove formed in an outer peripheral wall of said input shaft and communicating with said first circumferential port, an elongated groove formed longitudinally in the outer peripheral wall of said input shaft, and a second circumferential port formed in the outer peripheral wall of said input shaft and communicating with a limited number of cylindrical chambers of said constant-displacement unit as the associated cylinder block rotates on said input shaft, said elongated groove merging into said annular groove and said second circumferential port, said second pressure distribution passage means being formed by a first circumferential port formed in an outer peripheral wall of said valve sleeve and leading from said source of fluid under pressure, said first circumferential port of the second pressure distribution passage means communicating with another limited number of the cylindrical chambers of said variable-displacement unit as the associated cylinder block rotates with said input shaft, an annular groove formed in the outer peripheral wall of said input shaft and communicating with said first circumferential port of the second pressure distribution passage means through a passage formed in said valve sleeve, an elongated close-ended bore formed in said input shaft and communicating with said annular groove of the second pressure distribution passage means and a second circumferential port formed in the outer pheripheral wall of said input shaft and communicating with said bore and another limited number of the cylindrical chambers of the constant-displacement unit as the associated cylinder block rotates on said input shaft.

5. A hydromechanical power transmission system comprising, in combination, a housing through which an input shaft and an output shaft extend, a hydrostatic power transmission which includes a variable-displacement unit having a cylinder block which is rotatable with said input shaft, said cylinder block being formed with a plurality of substantially equidistantly spaced cylindrical chambers which are directed toward an axis of rotation of said cylinder block, a plurality of ball piston elements respectively received in said cylindrical chambers and movable therein toward and away from said axis, and an adjustable cam ring positioned around said cylinder block and pivotally connected to said housing for being rockable in a plane transverse to said axis, said adjustable cam ring having an inner cam surface with which said ball piston elements are in sliding engagement, a constant-displacement unit having a cylinder block integral with said cylinder block of said variable-displacement unit on said input shaft and formed with a plurality of substantially equidistantly spaced cylindrical chambers directed toward an axis of rotation of the cylinder block of the constant-displacement unit, a plurality of ball piston elements respectively received in said cylindrical chambers of said constant-displacement unit and movable toward and away from said axis of rotation of the associated cylinder block and a rotary cam ring positioned around said cylinder block of the constant-displacement unit and having an inner cam surface with which the ball piston elements of the constant-displacement unit are in sliding engagement, first pressure distribution passage means for providing fluid communication between those cylindrical chambers of said variable-displacement and constant-displacement units in which the ball piston elements received therein are moved toward the axes of rotation of the cylinder blocks of the two units as they revolve on the respective cam surfaces of the cam rings, second pressure distribution passage means for providing fluid communication between those cylindrical chambers of said variable-displacement and constant-displacement units in which the ball piston elements received therein are moved away from said axes of rotation of the two cylinder blocks, and actuating means operable to displace said adjustable cam ring in said plane for providing controlled degrees of eccentricity between the adjustable cam ring and the axis of rotation of the associated cylinder block, and a planetary gear train comprising a first rotary element driven by said input shaft, a second rotary element driven by said rotary cam ring, and a third rotary element connected to said output shaft.

6. A hydromechanical power transmission system according to claim 5, further comprising first and second valve sleeves respectively mounted between said input shaft and said cylinders of said variable-displacement and constant-displacement units, said first valve sleeve being secured to said housing and said second valve sleeve being rotatable with said rotary cam ring of the constant-displacement unit, said first pressure distribution passage means being formed by a first circumferential port formed on an outer peripheral wall of said first valve sleeve and leading from a source of fluid under pressure, said circumferential port communicating with a limited number of the cylindrical chambers of the variable-displacement unit as the associated cylinder block rotates with said input shaft, a first annular groove formed in an outer peripheral wall of said input shaft and communicating with said circumferential port, an elongated groove formed longitudinally in the outer peripheral wall of said input shaft, a second annular groove formed in the outer peripheral wall of said input shaft, said elongated groove merging into said first and second annular grooves, and a second circumferential port formed in an outer peripheral wall of said second valve sleeve for providing fluid communication beween said second annular groove and a limited number of the cylindrical chambers of said constant-displacement unit as the associated cylinder block rotates on said input shaft, and said second pressure distribution passage means being formed by a circumferential port formed on the outer peripheral wall of said first valve sleeve and leading from said source of luid under pressure, said circumferential port of the second pressure distribution passage means communicating with another limited number of the cylindrical chambers of said variable-displacement unit as the associated cylinder block rotates with said input shaft, a first annular groove formed in the outer peripheral wall of said input shaft and communicating with said circumferential port of the second pressure distribution passage means, an elongated close-ended bore formed in said input shaft and communicating with said first annular groove of the second pressure distribution passage means, and an annular groove formed in the outer wall of said input shaft and communicating with said bore for providing communication between said second annular groove of the second pressure distribution passage means and another limited number of the cylindrical chambers of said constant-displacement unit as the associated cylinder block rotates on said input shaft.

7. A hydromechanical power transmission system according to claim 1, in which said actuating means comprises a cylinder having opposite end walls, a piston slidable in said cylinder toward and away from said end walls and having a central aperture formed therein, said cylinder being internally divided by said piston into first and second fluid chambers which communicate with a source of fluid under pressure through first and second fluid passages, said second chamber being opened to the outside through a drain port formed in said cylinder, respectively, first and second piston rods projecting from both faces of said piston and axially movably extending outwardly through said end walls of the cylinder, said first piston rod having formed therein an axial bore merging into said central aperture in said piston and said second piston rod having formed therein an axial bore merging from said central aperture and terminating close to a closed leading end of said second piston rod, a rod valve extending into the bore in said second piston rod through the bore in said first piston rod and said central aperture in said piston and axially movable in said first and second piston rods and said piston, said rod valve having formed therein an axial bore which is opened to said axial bore in said second piston rod, first and second fluid passage means for selectively providing fluid communication between said axial bor in said rod valve and said first and second fluid chambers, respectively, as said rod valve is moved back and forth in said first and second piston rods, and a connecting member interconnecting said second piston rod and the cam ring of said variable-displacement unit for causing the cam ring to be displaced in said plane as said piston and said piston rods are moved relative to said cylinder.

8. A hydromechanical power transmission system according to claim 7, in which said first and second fluid passage means are formed by spaced first and second annular grooves formed in inner peripheral wall of said piston defining said central aperture, first and second fluid passages formed in said piston to provide constant fluid communication between said first and second fluid chambers and said first and second annular grooves in said piston respectively, and an elongated groove formed in an outer peripheral wall of said rod valve and located to intervene between said first and second annular grooves in said piston, said elongated groove in said rod valve being in communication with one of said first and second annular grooves in said piston as said rod valve is axially moved in either direction.

9. A hydromechanical power transmission system according to claim 1, in which each of the cam rings of said variable-displacement and constant-displacement units has formed in its cam surface an annular groove in which the ball piston elements in the associated cylinder block slidably fit.

* * * * *